(12) United States Patent
Markowitz et al.

(10) Patent No.: US 8,210,534 B2
(45) Date of Patent: *Jul. 3, 2012

(54) INFLATABLE VEHICLES FOR SIMULATING DRIVING FOR USE WITH VIDEO GAMES

(75) Inventors: Lipa Markowitz, Brooklyn, NY (US); Tang Chun Kit, Hong Kong (CN)

(73) Assignee: CTA Digital, Inc., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,890

(22) Filed: Oct. 25, 2011

(65) Prior Publication Data

US 2012/0040728 A1 Feb. 16, 2012

Related U.S. Application Data

(63) Continuation of application No. 13/080,611, filed on Apr. 5, 2011, now Pat. No. 8,042,811.

(60) Provisional application No. 61/331,673, filed on May 5, 2010.

(51) Int. Cl.
*A63F 9/24* (2006.01)
(52) U.S. Cl. ........... 273/148 B; 463/36; 463/37; 463/46; 463/47
(58) Field of Classification Search ............. 273/148 B; 446/220; 472/134; 463/36, 37, 39, 46, 47; 345/158; 297/181, 452.41; D21/300, 324–328, D21/332, 333, 419, 424, 483, 548–550
See application file for complete search history.

(56) References Cited

U.S. PATENT DOCUMENTS

| 4,817,950 | A | * | 4/1989 | Goo ................................. 463/36 |
| 5,951,404 | A | * | 9/1999 | Oishi et al. ....................... 472/60 |
| 8,042,811 | B1 | * | 10/2011 | Markowitz et al. ........ 273/148 B |
| 2007/0155495 | A1 | * | 7/2007 | Goo ................................. 463/36 |
| 2010/0009762 | A1 | * | 1/2010 | Takeda et al. ................... 463/47 |

FOREIGN PATENT DOCUMENTS

FR 2948577 A3 * 2/2011

OTHER PUBLICATIONS

"All Terrain Inflatable for Wii", 2010 [retrieved on Aug. 10, 2011]. Retrieved from the Internet <URL:http://ctadigital.com/item.asp?item=2867>.*
"Inflatable Racing Kart for Wii", 2010 [retrieved on Aug. 10, 2011]. Retrieved from the Internet <URL:http://ctadigital.com/item.asp?item=2815>.*
"Inflatable Racing Kart (Green) for Wii", 2010 [retrieved on Aug. 10, 2011]. Retrieved from the Internet <URL:http://ctadigital.com/item.asp?item=2869>.*
"Inflatable Racing Kart (Red) for Wii", 2010 [retrieved on Aug. 10, 2011]. Retrieved from the Internet <URL:http://ctadigital.com/item.asp?item=2868>.*

* cited by examiner

*Primary Examiner* — Raleigh W. Chiu
(74) *Attorney, Agent, or Firm* — Levisohn Berger LLP

(57) ABSTRACT

An inflatable vehicle for simulating a driving experience while playing realistic computer-video driving games such as the WII games. The vehicle is life-like in construction and allows a player to sit therein while playing driving game. A steering wheel or handle bar is configured to receive a game controller—which controls the video game when the steering wheel or handle bar is manipulated like a real life equivalent thereof.

3 Claims, 15 Drawing Sheets

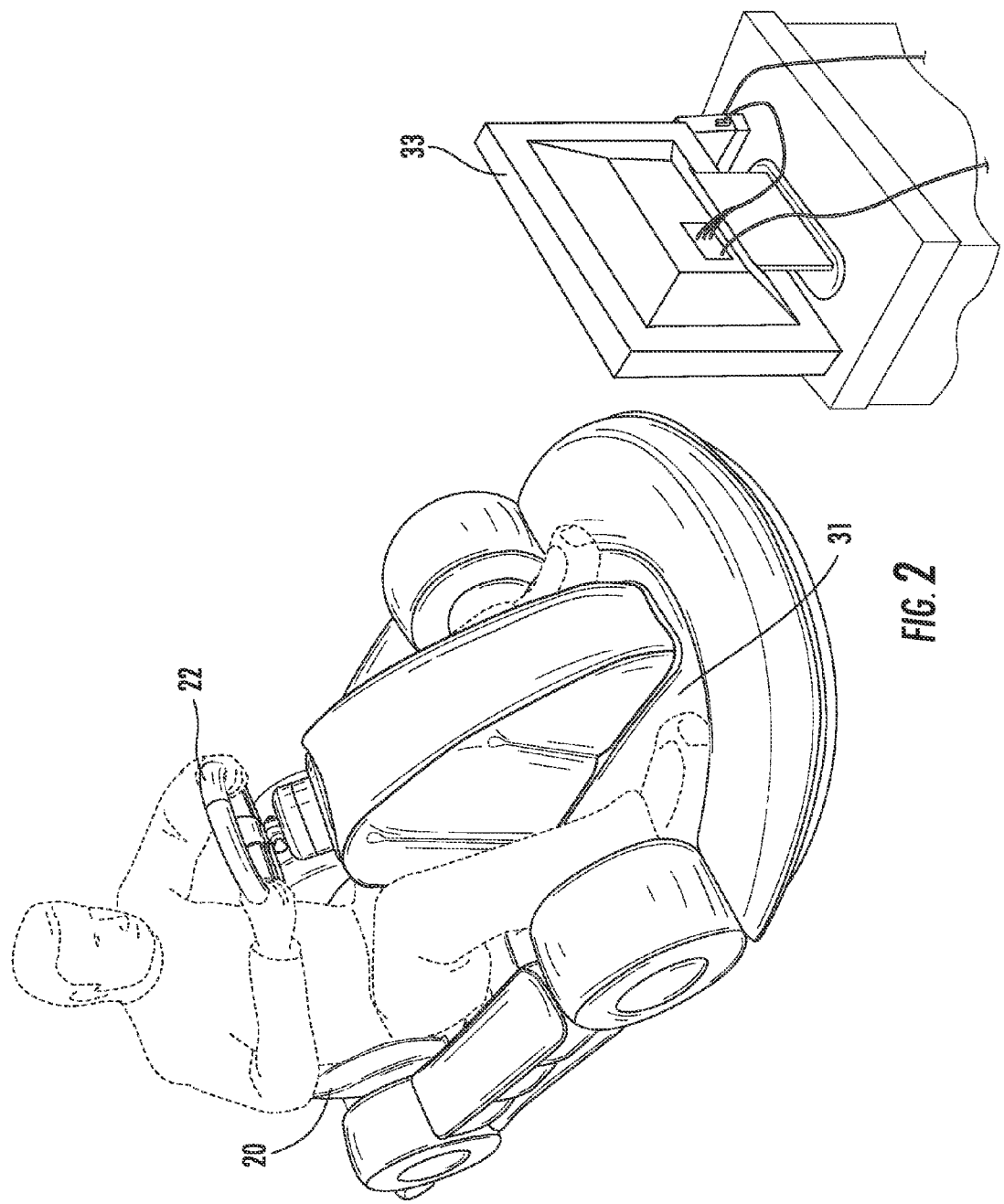

INFLATABLE VEHICLES FOR SIMULATING DRIVING FOR USE WITH VIDEO GAMES

RELATED APPLICATIONS

This application is a continuation of U.S. application Ser. No. 13/080,611 filed Apr. 5, 2011 and issued as U.S. Pat. No. 8,042,811 on Oct. 25, 2011, which itself claims the benefit of U.S. Provisional Pat. Appl. Ser. No. 61/331,673, filed on May 5, 2010, the contents of which are incorporated by reference herein.

FIELD OF THE INVENTION

The current invention relates to the field of video game accessories, more specifically to an inflatable vehicle that is adapted to receive a WII game controller.

BACKGROUND OF THE INVENTION

For many years, video games have been a popular form of entertainment for players of all ages and skill levels. Since the earliest games have first been introduced to the public, there has been a continuous effort on the part of game developers to produce games having a realistic feel. In this regard, the NINTENDO WII presents a vast improvement to the state of the art.

WII games are played by means of a WII controller. The WII controller uses accelerometer and optical sensor technology to sense the motion imparted by a player to accordingly manipulate images displayed on a game display screen. Players of WII games use the WII controller to simulate the various motions associated with all types of games and sports such as, for example, bowling, golf, baseball, basketball, golf, tennis, boxing and car racing.

The closest that developers have come to simulating a driving experience is through the means of a steering wheel device, which houses a WII controller. The steering wheel is not connected to any supporting structure, but rather is it held in a player's hands and rotated about its axis by a player.

Because of several factors, the WII steering wheel does not successfully replicate the driving experience. First, a player sits in his/her normal surroundings—which is very different from sitting in the confines of a vehicle. Moreover, the steering wheel must be held with two hands at all times because it is not attached to any supporting structure.

The concept of an inflatable kart for use by a player during video game play already exists in a product identified as the WINFUN Plug and Play kart. The WINFUN game does not simulate the real world experience of the WII game in that it does not sense the movement of the steering wheel as a real parameter in the skill of the driver operating the simulated automobile. Instead of a rotatable steering wheel that is adapted to receive a game controller, the WINFUN product comprises a hard-wired control having buttons to control movement on a screen. In fact, as a consequence of the real life action achieved with the current invention, the inventors have found that it is important to ensure that the steering column be securely attached to the housing because of the need for such connection to be maintained and to provide an accurate driving experience. Such secure attachment was not required with the WINFUN product.

SUMMARY OF THE INVENTION

The invention is directed to a realistic-appearing inflatable vehicle, in which a player sits when playing a driving game. The steering wheel (or handle bar) is provided with one or more compartments for receiving a WII or a similar game controller(s). A player sits in the vehicle seat while playing the game and turns the steering wheel in much that same way as a person would while driving a real vehicle. The controller is secured within the steering wheel and is largely obscured from a player's view. This adds to the authenticity of the experience.

Additionally, a steering wheel attachment mechanism for attaching the steering wheel to the housing of the kart is reinforced above and beyond a conventional connection in toy karts to ensure that there is not physical separation between these elements as the game is being played. Because of the intense experience achieved with the WII game, such secure connections ensure the game is played without it failing as the driver becomes more and more excited.

The invention thus allows for players to experience realistic driving conditions while playing a WII driving game thereby enhancing the overall game experience.

The vehicles are inflatable and therefore compactly transported and stored. Once inflated, they are light and portable. In addition, they may be easily deflated for convenience of storage.

BRIEF DESCRIPTION OF THE DRAWINGS

FIG. 2 is a perspective view of a user operating a race car according to an embodiment of the invention.

DETAILED DESCRIPTION OF THE INVENTION

Embodiments of the present invention will now be described with reference to the above-identified figures. However, the drawings and the description herein of the invention are not intended to limit the scope of the invention. It will be understood that various modifications of the present description of the invention are possible without departing from the spirit of the invention. Also, features or steps described herein may be omitted, additional steps or features may be included, and/or features or steps described herein may be combined in a manner different from the specific combinations recited herein without departing from the spirit of the invention, all as understood by those of skill in the art.

Figure 1:
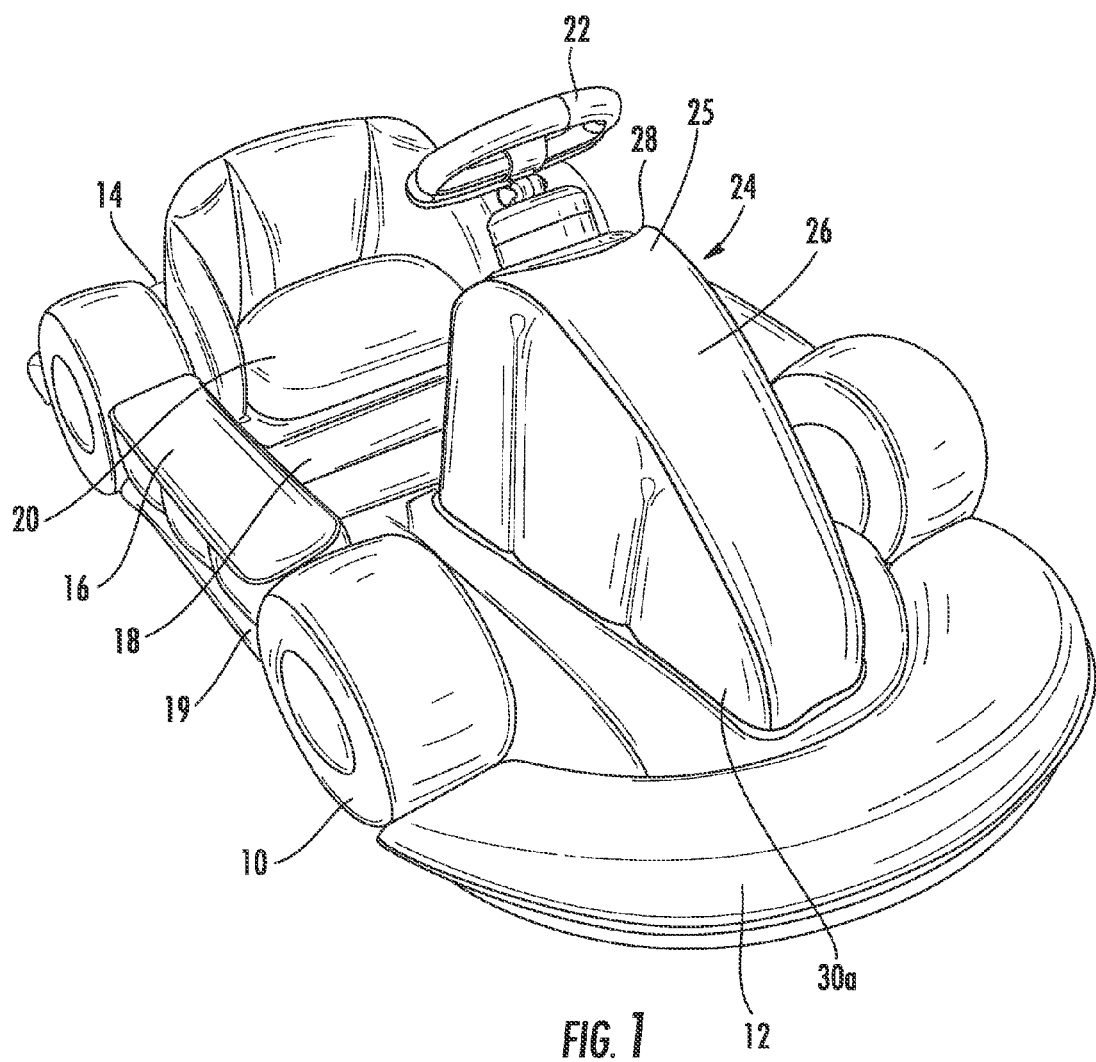
FIG. 1 is a front, perspective view of a race car according to an embodiment of the invention.

FIG. 1 shows an inflatable race car that is fashioned to resemble a real-life car having wheels 10, a front bumper 12, a rear bumper 14, doors 16, a dashboard 28 and a steering wheel 22. The interior of the car has a floor surface 18 and a seat 20, which is positioned near the rear end of car. An underlying chassis 19 supports the structural elements of the car.

Toward the front end of the car, there is a front body structure 24, which arises from floor surface 18. The front body structure 24 serves as a front body of the vehicle and as a steering wheel attachment structure. Front body is an elevated structure 24 having a first end (base) rising from the floor surface 18 and a second end forming a gradual peak 25. Two sidewalls 30a, 30b descend from peak 25 toward each side of the car and are each flanked at their base by an exposed floor surface. Another two walls slope frontward and rearward. A frontward wall 26 descends from peak 25 facing the exterior of the car ("exterior wall") and a rearward wall 28 faces the interior of the car ("interior wall"). The exterior wall 26 is designed to look like the front hood of a race car—having a gradual downward slope. The interior wall is a dashboard 28 and it serves as a location for mounting the steering wheel 22. Dashboard 28, is provided with an attachment mechanism for pivotably attaching a steering wheel 22.

The various structural elements, such as, for example, the chassis 19, wheels 10, seat 20 and front body 24 each comprise a respective-shaped structures made of PVC or such similar material. The respective structures take shape when they are fully inflated with air. It will be understood that some of the structures may be independently formed and require to be separately inflated, whereas, other structures may be in fluid communication with each other such that air is shared between two or more structures.

As shown in FIG. 2, during play, a player sits on seat 20 resting his/her feet on the floor and naturally grasps the steering wheel 22 in the same manner as one would when driving a real-life vehicle. The motion of the steering wheel is sensed in the WII game by line of sight communication between the controller held in the steering wheel 22 and a console located in the proximity of a screen 33. The motion of the steering wheel is, thus, sensed as real life motion to control images displayed on a display device. There are other motion sensitive driving games which can sense movement of a specific game controller and such games can advantageously use this invention.

Figure 7:
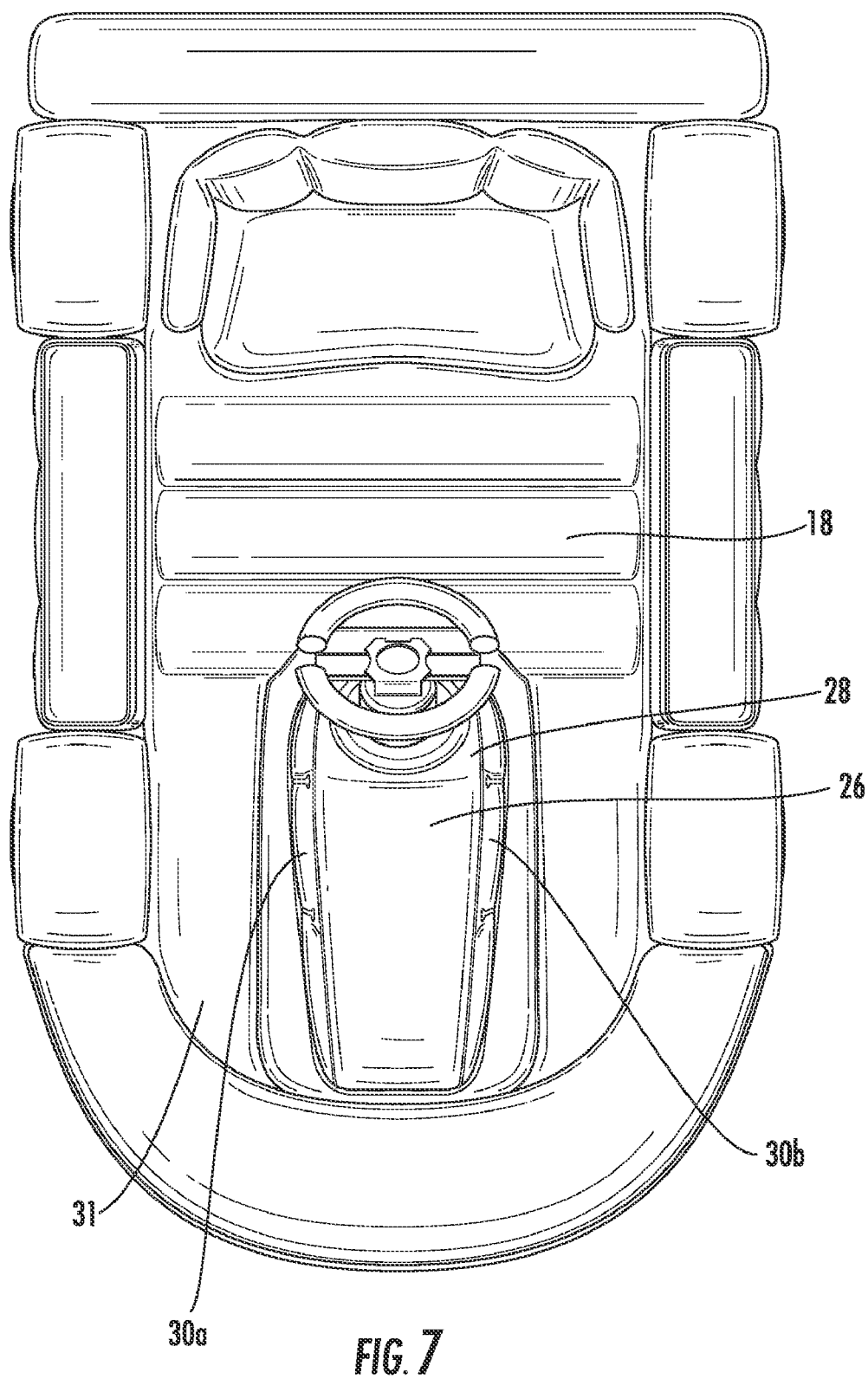
FIG. 7 is a top plan view of a race car according to an embodiment of the invention.

In a preferred embodiment of the invention, the car is designed to accommodate both adults and children alike. For example, to best accommodate players of wide ranging heights, the ear is designed with an elongated foot resting area 31 (best shown in FIG. 7)—for receiving a player's foot in any location along the elongated area 31. In a preferred embodiment, foot resting area 31 is an exposed floor surface 18 on either side of front body structure 24. A player sitting on seat 20 places his/her feet in foot resting area 31. The legs of an adult or tall player may extend entirely into foot resting area 31 (as shown in FIG. 2), whereas the legs of a child might extend only partway into foot resting area 31. In addition, the car design also allows for a child to sit directly on the floor 18 in front of seat 20 to better reach steering wheel 22.

The distance between seat 20 and front body structure 24 is preferably from about 200 mm to 250 mm. This distance was found by the inventor to best accommodate the fullest range of player heights. The width of seat 20 is from about 330 min to 400 mm.

Furthermore, steering wheel 22 may be adjusted (e.g. between the two positions depicted in FIG. 6) to tailor steering wheel accessibility to players of various heights. A short player, for example, will move the steering inward (toward him/herself) for ease of reach, whereas a taller player might tilt the steering outward (away from him/herself).

In addition to adjustability, the steering wheel is securely mounted such that it is able to withstand forces exerted by an adult playing the WII game. To that end, the various components that comprise the steering wheel attachment and locking mechanism (described in more detail below) is reinforced and designed to be of high integrity.

In order to support adults, a thick PVC (or a material similar thereto) material is used. In a preferred embodiment, the PVC is double the thickness of inflatable pool toys.

Figure 3A:
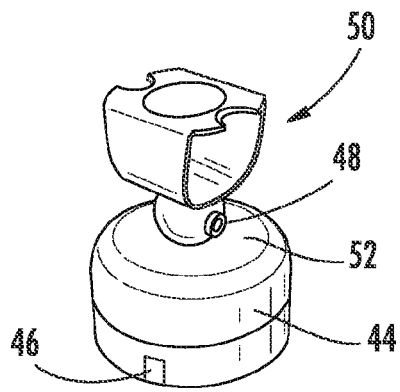
FIGS. 3A-3B are exploded perspective views of a steering wheel attachment mechanism according to an embodiment of the invention
Figure 3B:
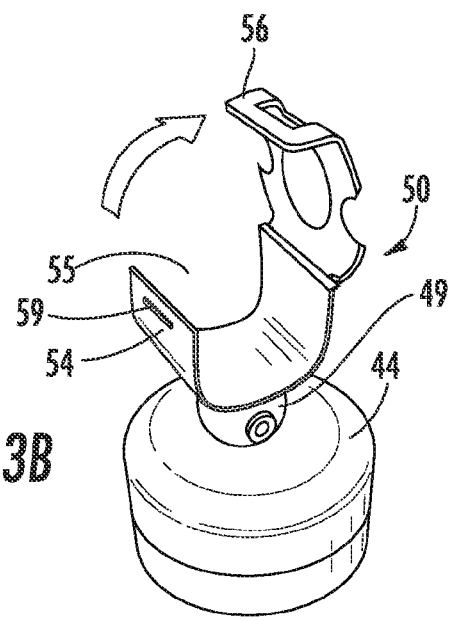

FIGS. 3A and 3B show a steering wheel attachment mechanism according to an embodiment of the invention. As shown, a base member 40 is securely attached to the dashboard 28 of front structure 24. Preferably, a permanent glue is utilized to attach base member 40. Most preferably the permanent glue is of a kind that possess elastic qualities after being fully dried. Base 40 is adapted to receive a wheel attachment mechanism for attaching a steering wheel. For example, in a preferred embodiment, a collar 42 attached to base 40 is sized and shaped to be inserted into a complementary tubular steering column cap 44. Steering column cap 44 is designed to be tightly secured to collar 42. To that end, in a preferred embodiment of the invention, collar 42 comprises one or more attachment tabs 130 (best seen in FIG. 4A) helping to ensure a secure connection between the steering column and base 40 or body of the kart. This will be described in more detail below with reference to FIGS. 4 and 5.

As an added security measure and to ensure proper alignment, in an embodiment of the invention, tab 46 is vertically slidably connected to column cap 44, which moves into a corresponding slot 48 in collar 42. Tab 46 slides upward and downward (i.e. toward and away from the collar as oriented in FIG. 3a)—but not laterally. To secure the steering wheel, a user inserts the cap 44 into collar 42 and rotates it until the parts are assembled and locked together as will be described below.

It will be understood by those of ordinary skill in the art that the parts of the steering column may be connected by any of various engagement means—all of which are within the scope of the invention. For example, column cap 44 may be held within collar 42 by way of a tight frictional engagement, detent mechanism, threaded engagement or any similar locking mechanism. In addition, the steering wheel and steering column cap could be permanently mounted to the inflatable vehicle or made unitary therewith. Still further, in another embodiment of the invention—a steering column cap is not required. Rather, a steering wheel could be mounted by a pivot directly onto a base provided on the vehicle—obviating the need for a steering column cap.

Each of the engagement means requires that the securement between the steering column cap and body be such that it is sufficiently strong that even an adult excited during the playing of the WII game can not physically separate the steering wheel from the body of the inflatable kart.

FIG. 3B shows a perspective view of the steering column cap 44. As shown, a rotating head 49 couples a steering wheel cradle 50 to the steering wheel column 44. In a preferred embodiment, head 49 extends from a cylindrical shaft (not shown) that is rotatably held in the interior of steering column cap 44. The cylindrical shaft serves as an axle for the movement of head 49. Head and attached cradle 50 are thereby free to rotate as would a real-life steering wheel. In a preferred embodiment, however, in the interior of the steering column cap, the cylindrical shaft that supports head 48 is attached to two springs at two diametrically opposed regions. The result of the attached springs is that when not acted upon by a user, the cylinder (and ultimately the attached steering wheel) is biased to return to a default position.

Steering wheel cradle 50 comprises a bottom, fixed member 54 and a top movable cover member 56. Bottom member 54 has a floor and two opposing sidewalls that form a carriage 55. Bottom member 54 and top cover 56 are preferably joined together—most preferably by way of a mechanical or live hinge. Steering wheel cradle 50, selectively attaches the steering wheel 22 to the steering column cap 44—as described in more detail with reference to FIGS. 3C-3F.

Figure 3C:
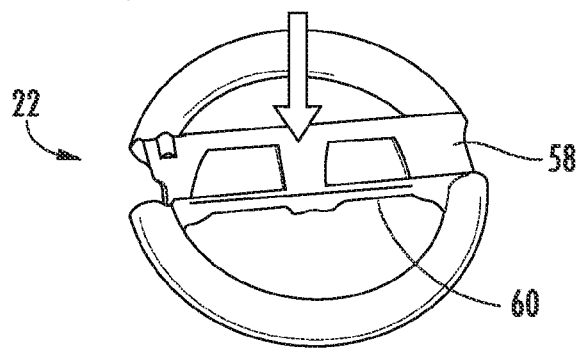
FIG. 3C-3F are exploded perspective views showing a game controller being inserted into the steering and the steering wheel being fastened to the attachment mechanism according to an embodiment of the invention.

FIG. 3C a shows steering wheel 22 having a compartment 58 for receiving a game controller 60. The steering wheel 22 is preferably molded of plastic or such similar material. As shown, a crossbar 60 (or spoke) spans the diameter of the steering wheel 22. In a preferred embodiment, crossbar 60 is molded to comprise a groove that is sized and shaped to conform to the outside contours of a respective game controller. A user places the controller 60 into the compartment 58, which fits snugly therein. Crossbar 60 functions as part of a compartment for receiving a game controller and as the attachment point for the steering wheel 22 (as described in more detail below).

Figure 3D:
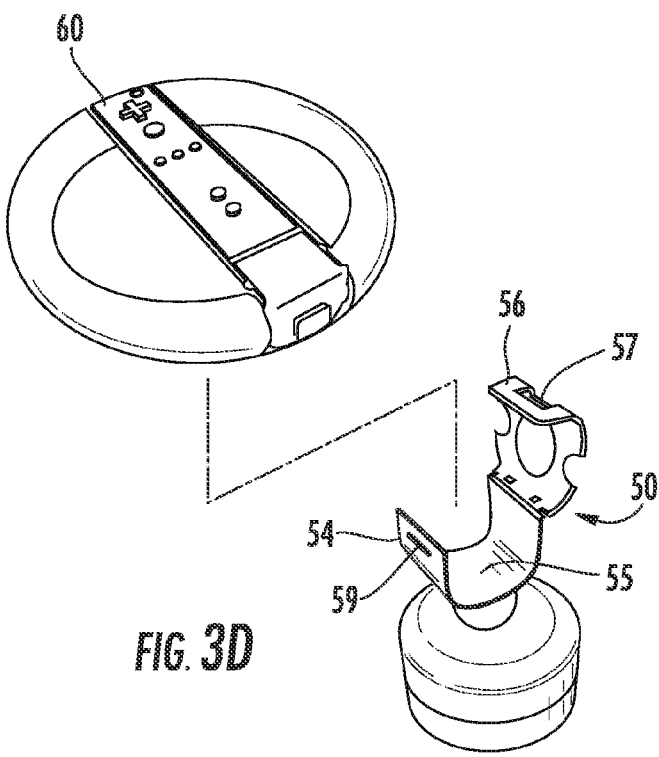
Figure 3E:
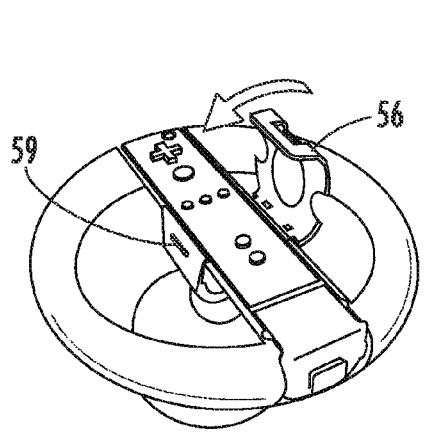
Figure 3F:
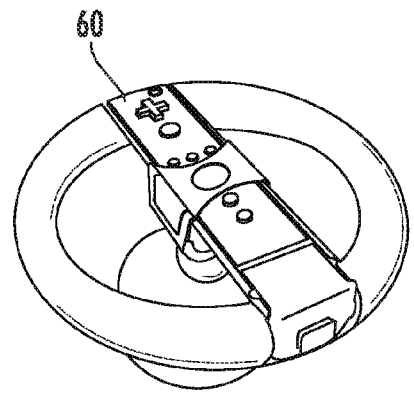

Referring to FIG. 3D, with the controller 60 placed within the compartment 58, the steering wheel 22 is ready to be attached to the steering column cap 44. To that end, a user opens the cover 56 of steering wheel cradle 50 to expose carriage 55. Carriage 55 is sized and shaped to accommodate an underside surface of crossbar 60. Once the steering wheel 22 with a game controller 60 positioned therein is placed into the carriage 55—top cover 56 is pressed downward (FIG. 3E) to a closed position (FIG. 3F). In a preferred embodiment, a slot 57 provided on cover 56 catches a corresponding elongated tooth 59 on bottom member 54. Slot 57 and tooth 59 engage to keep maintain cover 56 in a closed position. Cover 56 functions to secure the steering wheel 22 to the steering column cap 44 and to secure the game controller 60 within the compartment 58. The steering wheel 22 is thus easily attachable/detachable from the vehicle via cradle 50.

It should be noted that in some embodiments of the invention a top cover or clasp is not required to maintain the controller within the compartment. Rather, compartment 58 is sized to capture and maintain the controller in a tight frictional grip. Furthermore, steering wheel may be fixed to a pivoting member—obviating the need for a cradle.

FIGS. 4A through 4G illustrate and show the interconnection between collar 42 and steering column cap 44. In fact, collar 42 and steering column cap 44 comprise an interconnectable steering wheel attachment mechanism allowing the parts which comprise the inflatable kart to be separated and yet securely assembled when use is desired.

While the terms steering column cap 44 and collar 42 are used to identify the parts, it is understood that a steering column cap is that portion of the kart between the base 40 and rotating head 49. A "steering wheel attachment mechanism" is coupling device for coupling a steering wheel to a vehicle body.

Figure 4A:
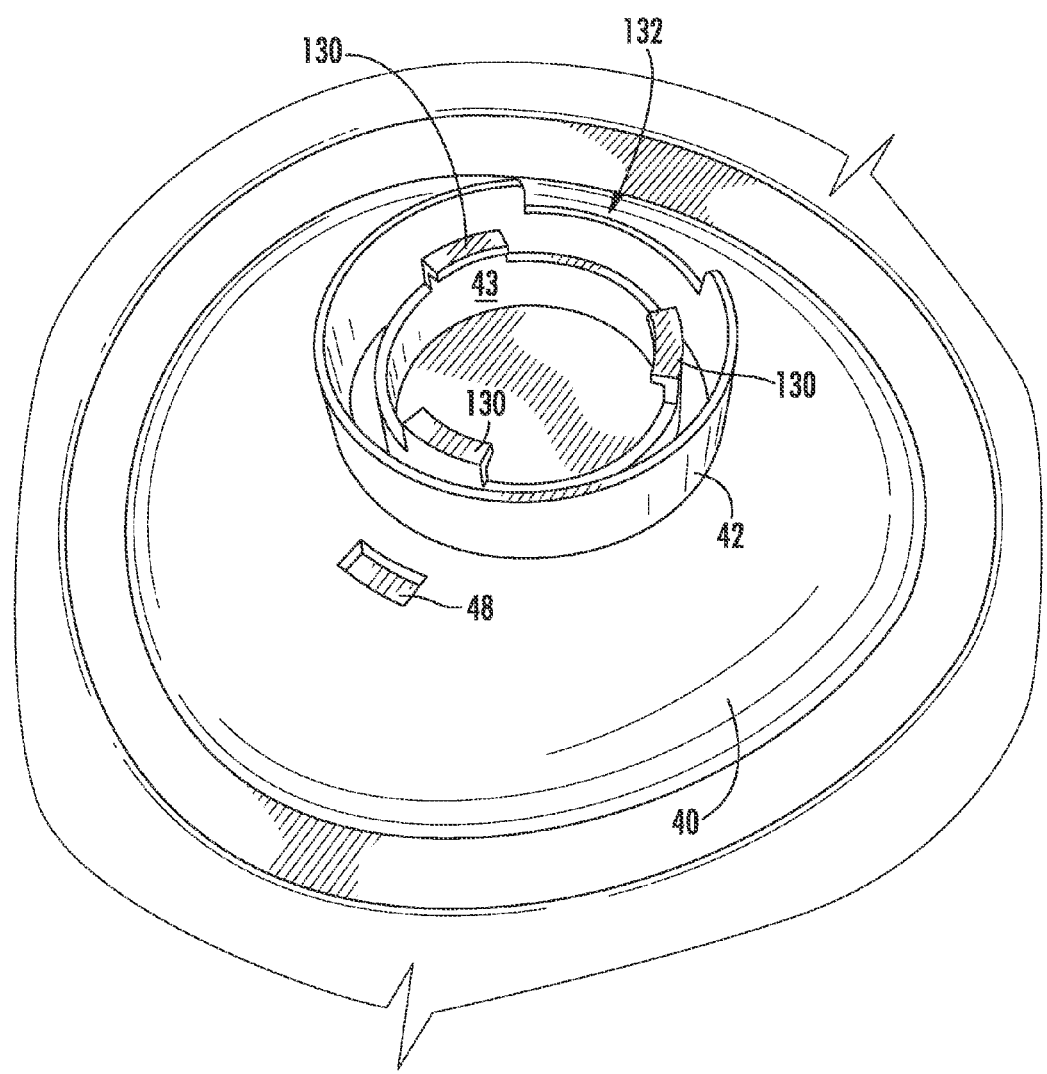
FIG. 4A is a top perspective view of a base member and a collar according to an embodiment of the invention.
Figure 4B:
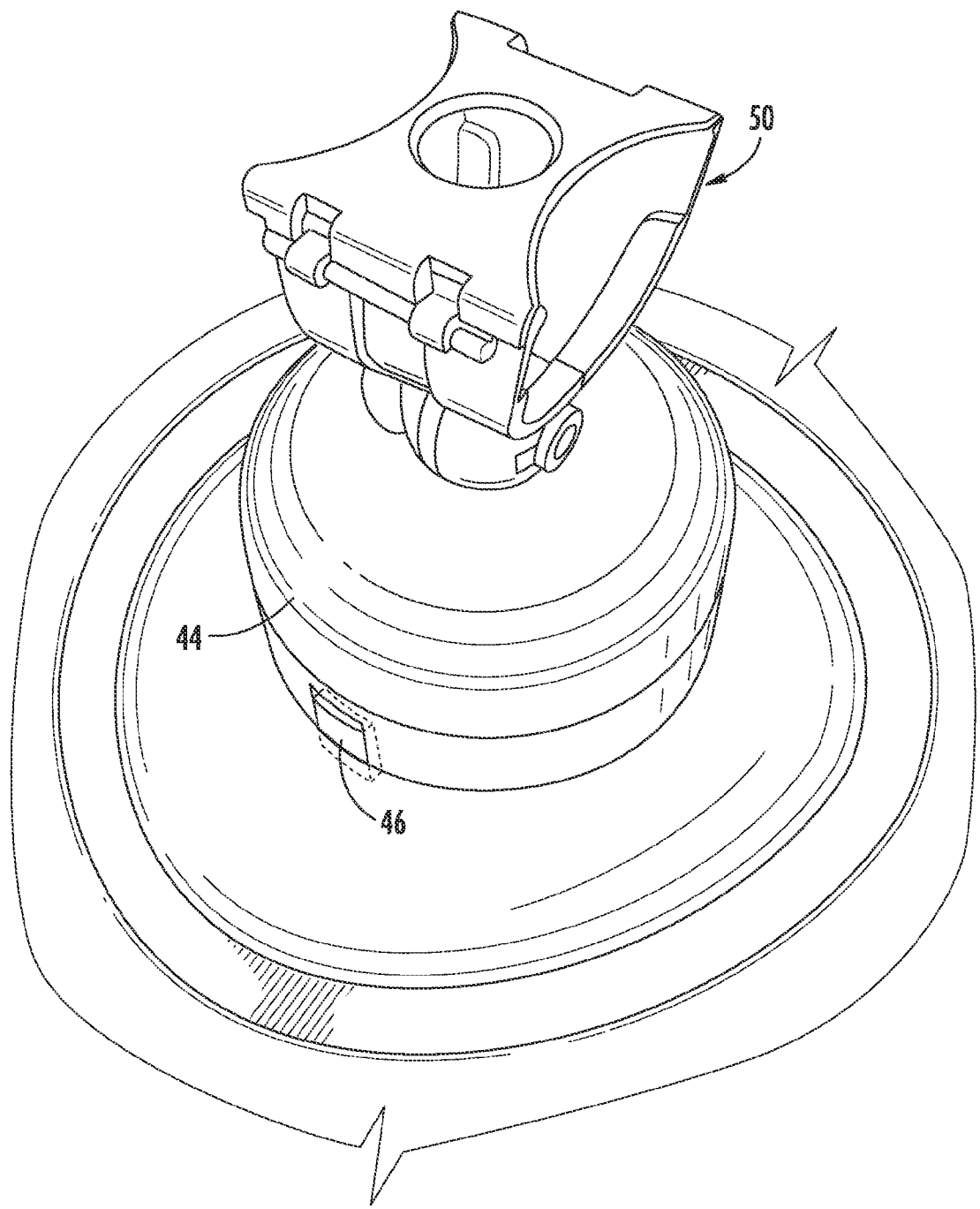
FIG. 4B is a perspective view showing a steering column cap assembled to the steering column base according to an embodiment of the invention.
Figure 5:
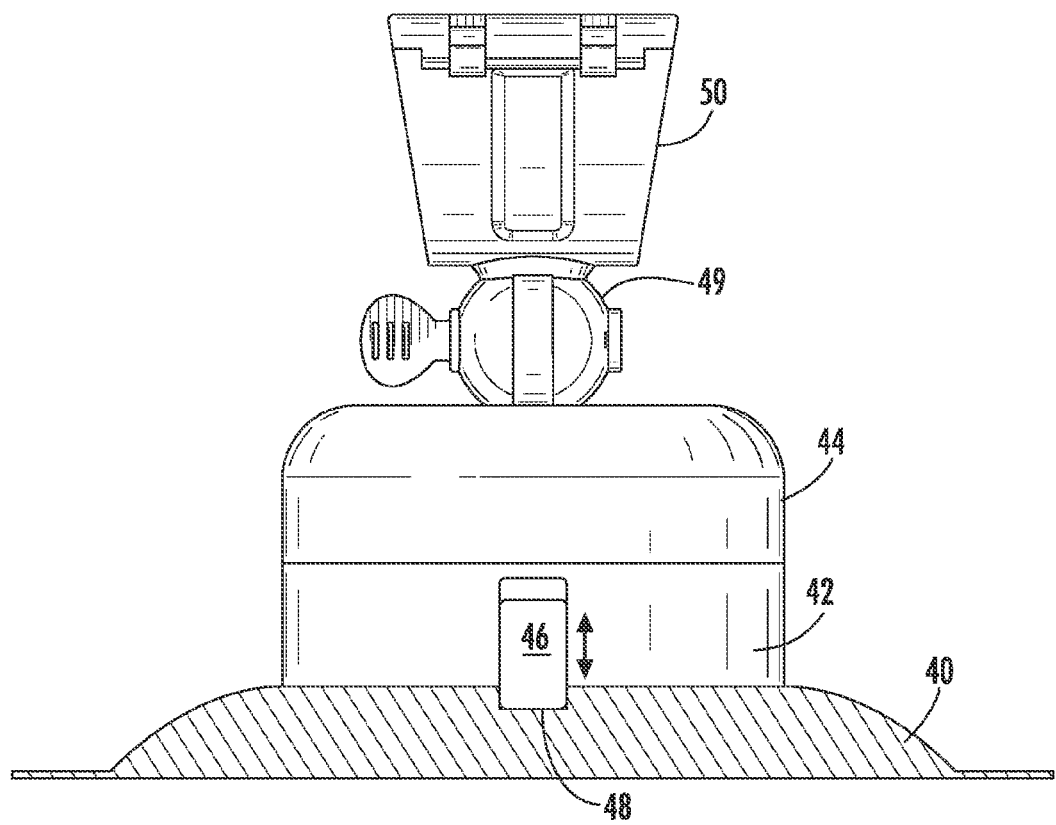
FIG. 5 is a side elevational view showing the steering wheel attachment mechanism coupled to the base with an interlocking tab according to an embodiment of the invention.

FIG. 4A shows collar 42 which is attached to base 40 in a secure manner. A slot or receptacle 48 is provided, the purpose of which will be described hereinafter. Collar 42 is annular and encloses therewithin a plastic socket member to which column 44 is attached. Collar member 42 comprises an inner annular ring 43 having annularly located tabs 130. Additionally, an opening 132 in the upper portion of the annular wall of collar member 42 is provided for ease of assembly.

Figure 4C:
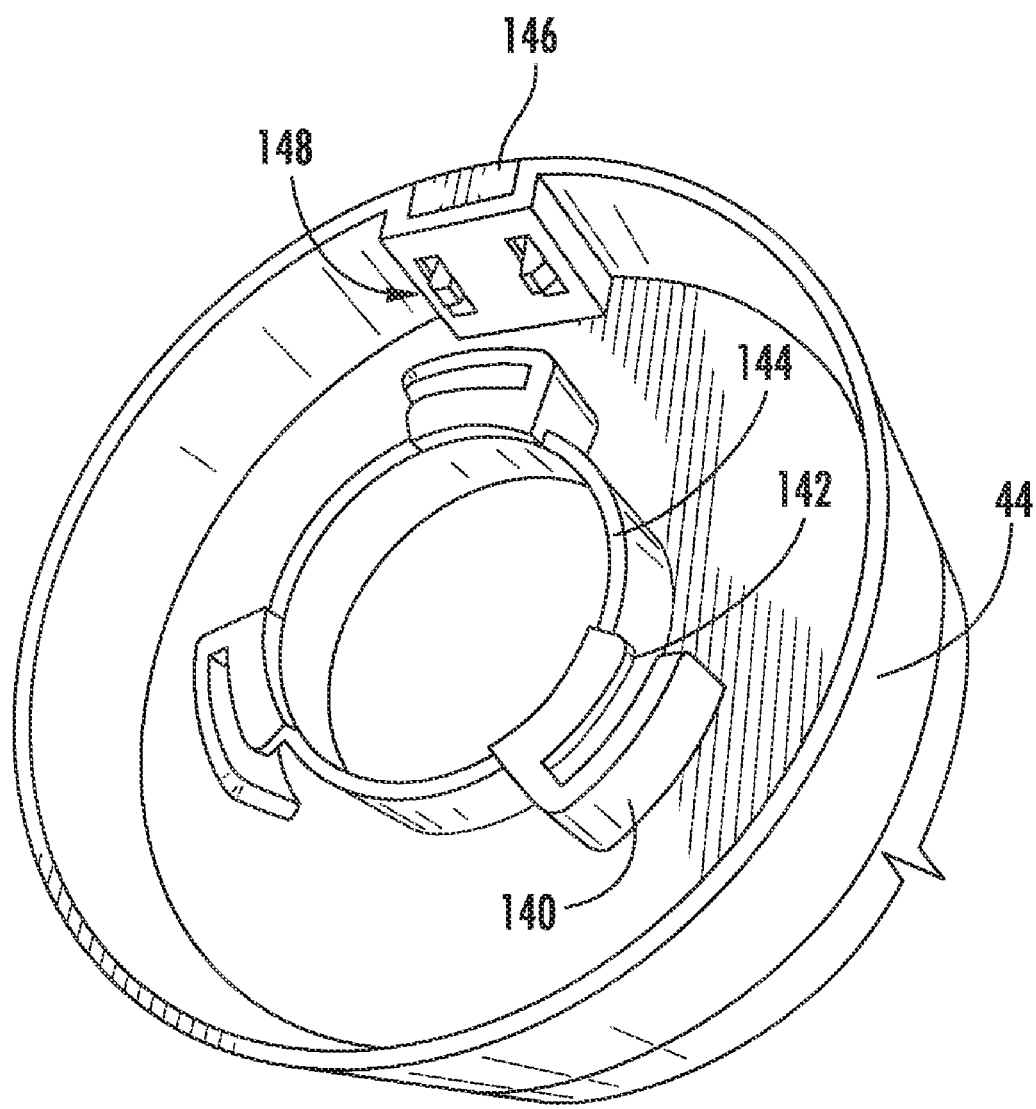
FIG. 4C is a perspective view of the underside of a steering column cap showing interlocking mechanisms for attaching the steering wheel to the base according to an embodiment of the invention.

FIG. 4C is a perspective view of the underside of steering column cap or cap 44. Column cap 44 is a tubular member which is adapted to attach to collar 42. Three slotted locks 140 are attached to an inner annular ring member 144 and are integrally formed therewith. Each locking member 140 comprises an inner slightly curved slot 142 which is adapted to receive tabs 130 in collar 42. As may be seen from FIG. 5, slot 48 receives tab 46 as will be described hereinafter.

Figure 4D:
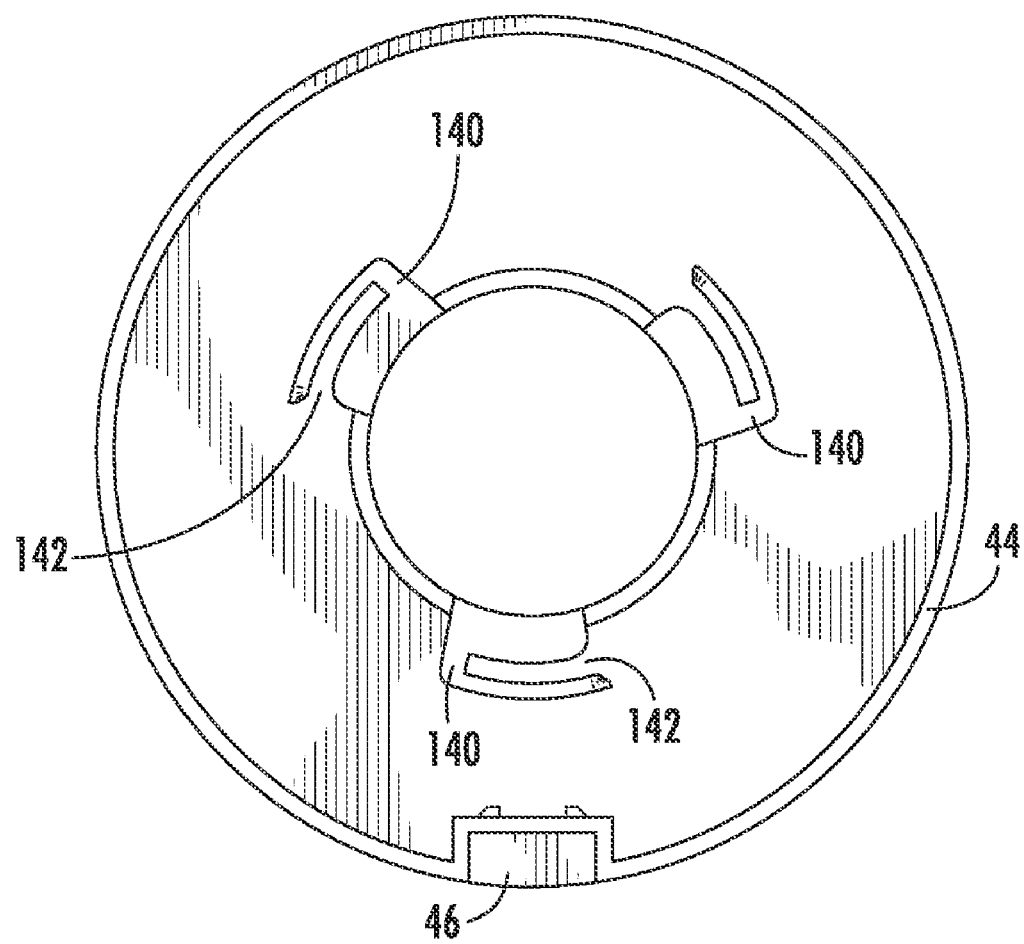
FIG. 4D is a bottom plan view of column cap shown in FIG. 4C.
Figure 4E:
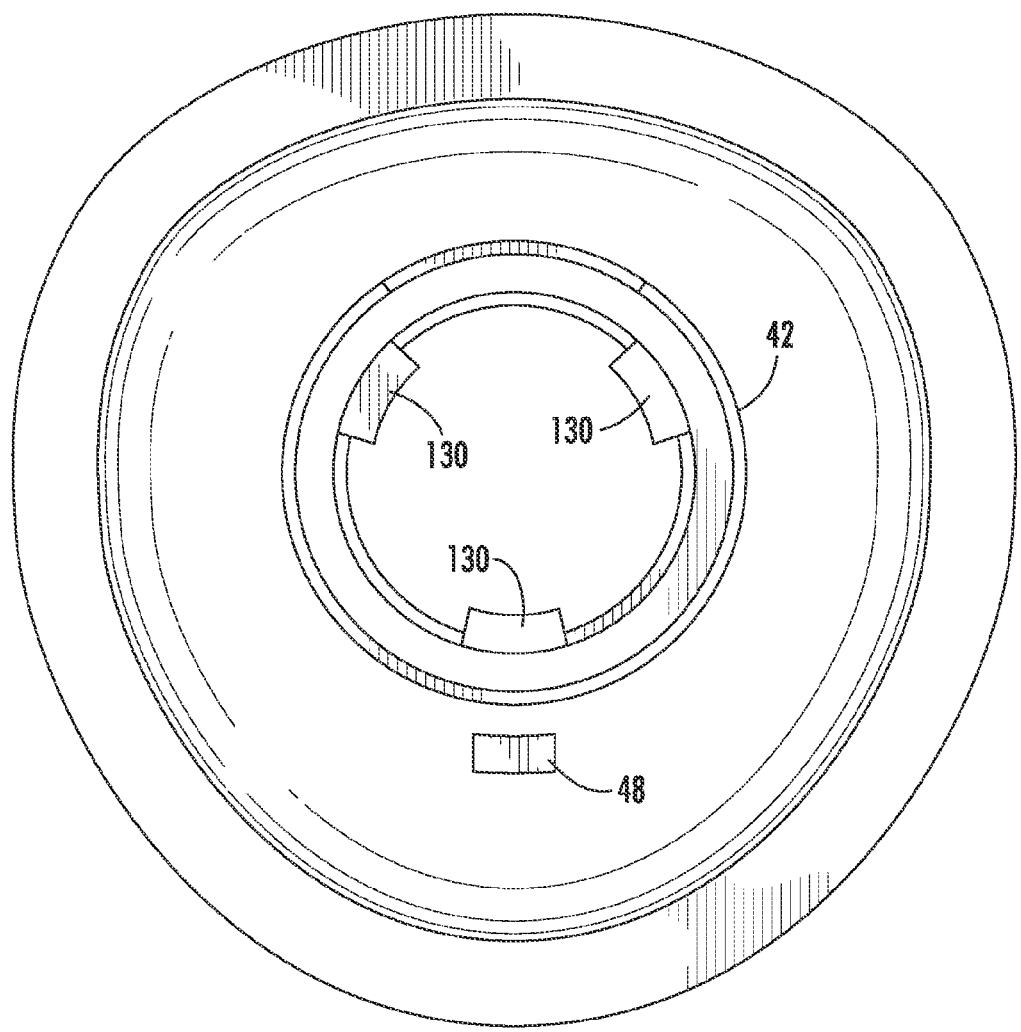
FIG. 4E is a top plan view of a base member and collar according to an embodiment of the invention.

FIGS. 4D and 4E are respectively bottom and top plan views of members 44 and 42 showing the interlocking members 130 and 140.

Figure 4F:
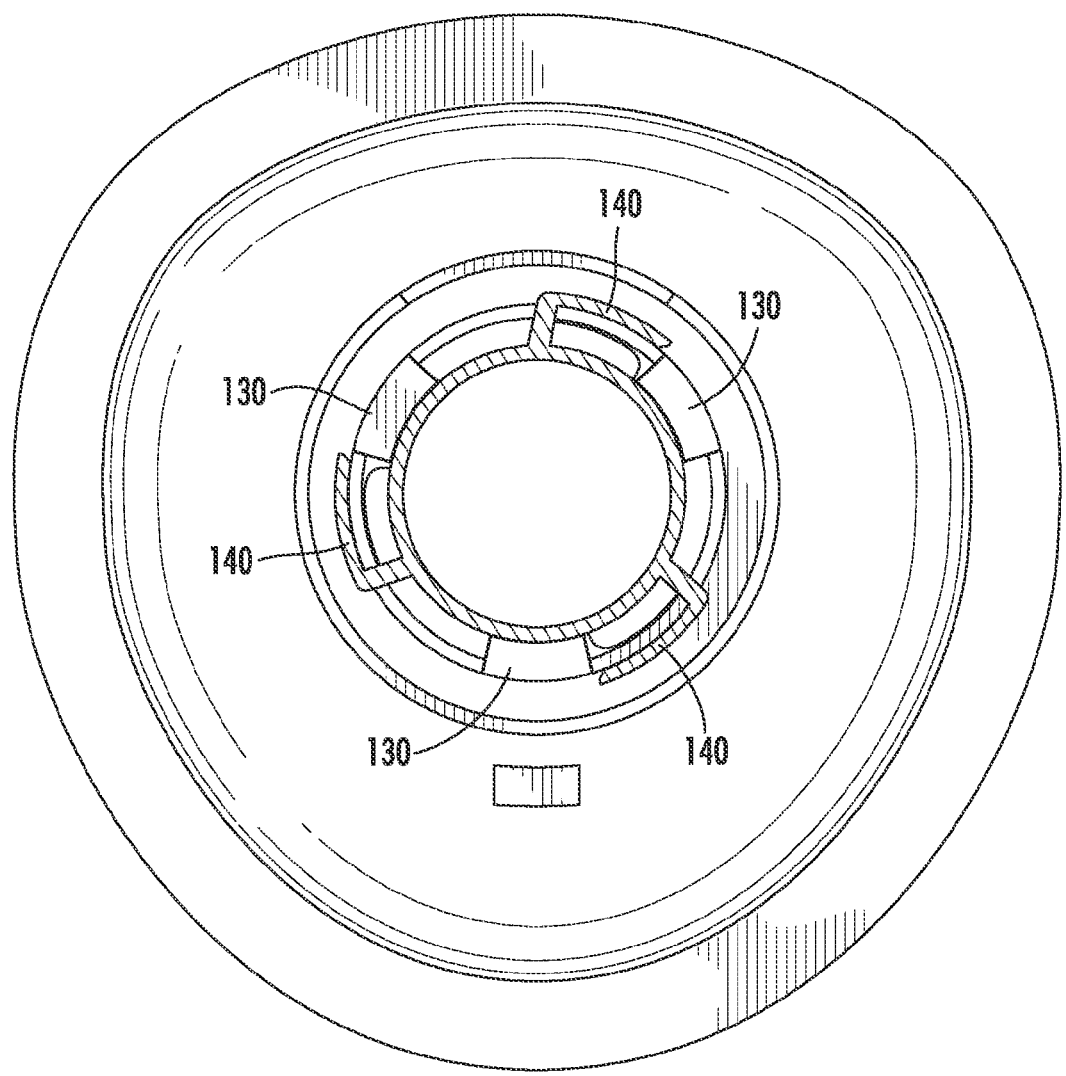
FIG. 4F is a top plan view showing the interlocking mechanisms provided respectively on the column cap and collar before they are rotated together according to an embodiment of the invention.
Figure 4G:
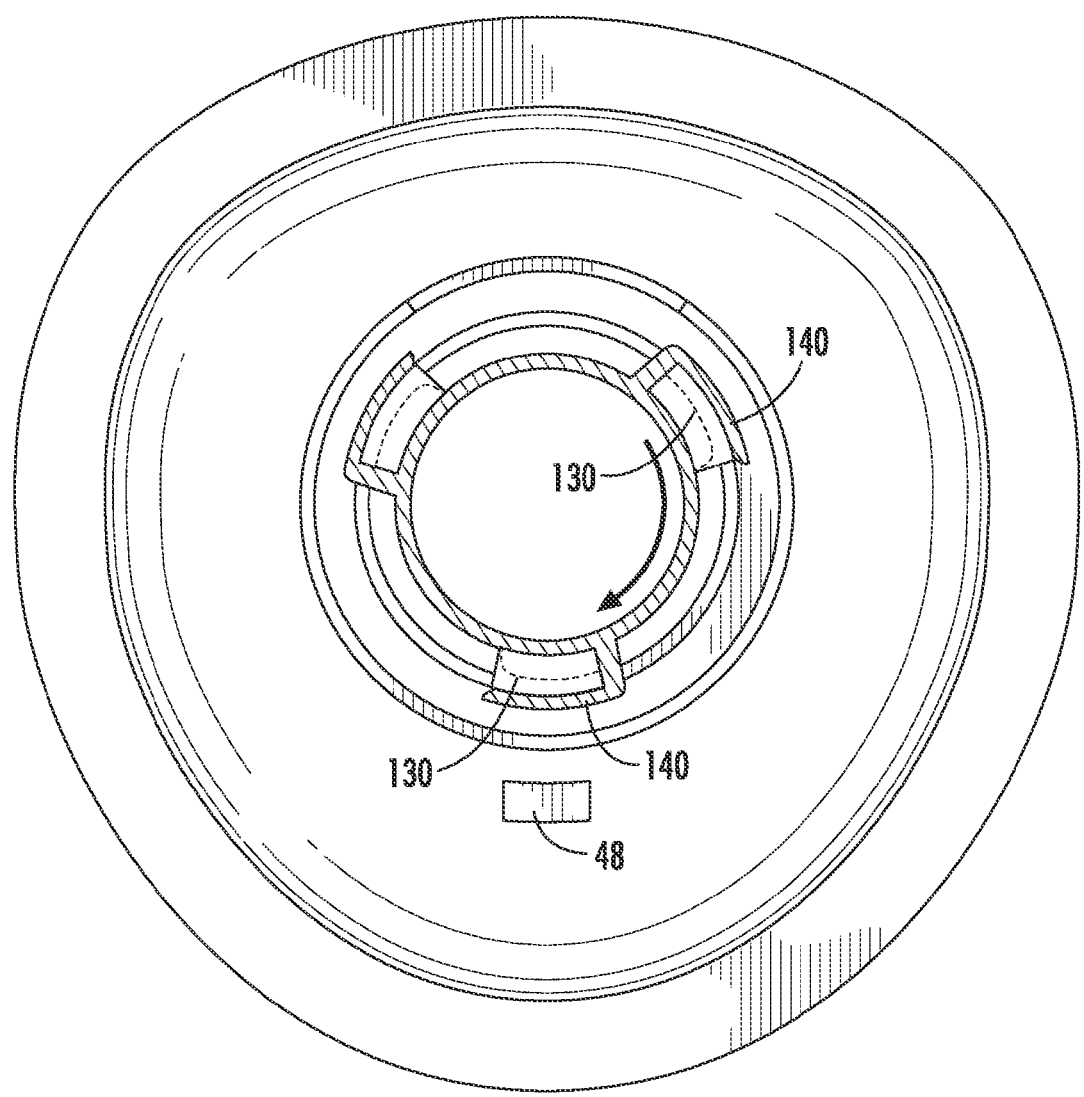
FIG. 4G is a top plan view of the interlocking mechanisms of FIG. 4F showing the rotation of the members locking them together.

FIGS. 4F and 4G illustrate how members 130 and 140 interlock with tabs 130 fitting into the slot area formed in part by slot 142 and the surrounding wall structure thereabout. When receptacles 140 are rotated (in a clockwise manner in the orientation depicted in FIGS. 4F and 4G) they capture tabs 130 as illustrated in FIG. 4G.

In one preferred embodiment of the invention, a locking mechanism is provided to further ensure that these members may not become separated during active use. For example, tab 46 is moved downwardly as in FIG. 5 to lock into recess 48 in base 40, preventing relative rotation between cap 44 and collar 42. The additional locking mechanism provided by tab 46 in slot 48 further ensures against separation of the steering wheel column assembly during active use. As shown in FIG. 4C, a pair of locking teeth 148 disposed in parallel channels attach tab 46 to column cap 44 and which prevent lateral movement of the same.

Figure 6:
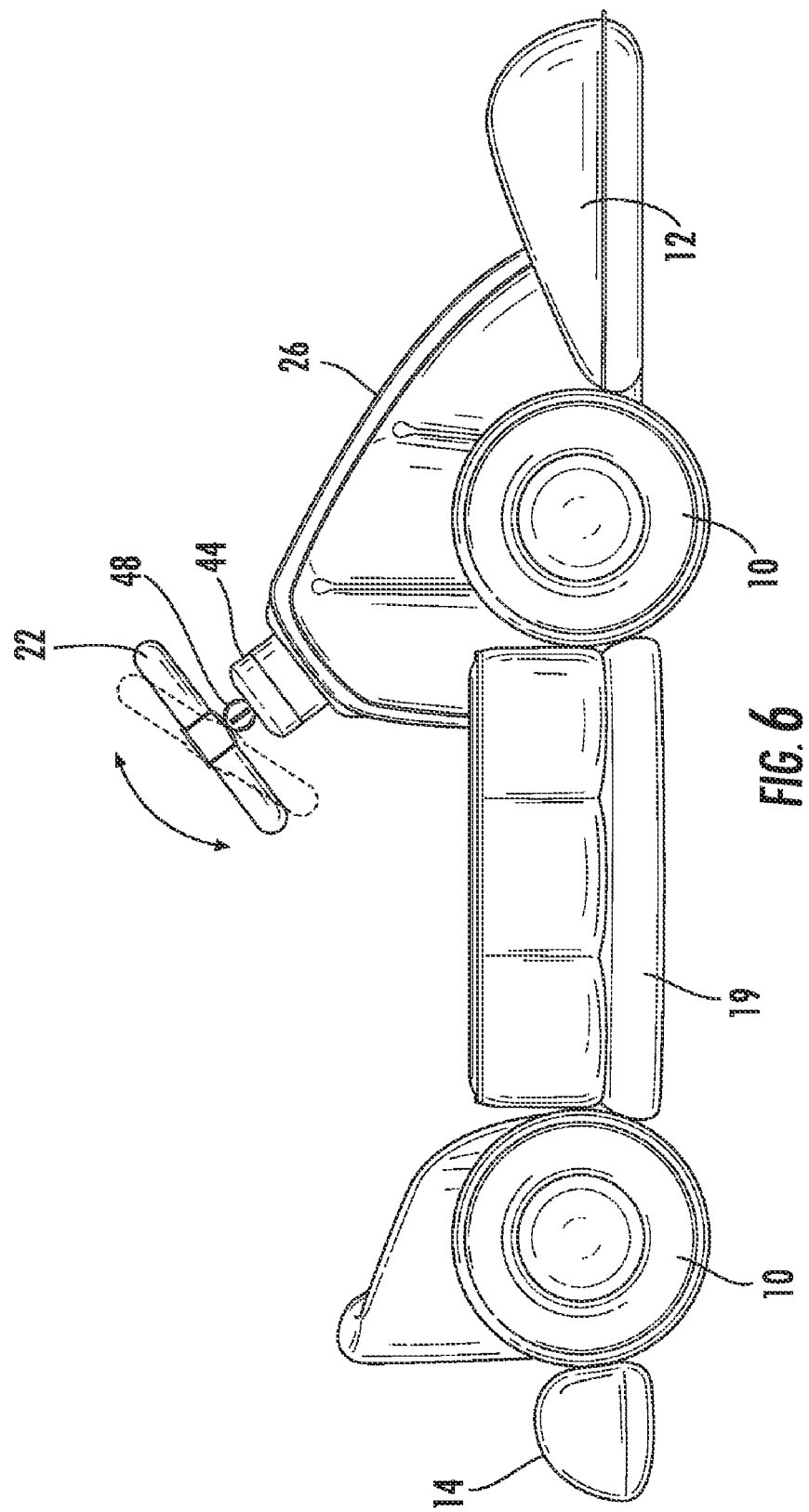
FIG. 6 is a side elevational view of a race car according to an embodiment of the invention.

Referring to FIG. 6, in a preferred embodiment of the invention, cradle 50 is connected to head 48 by way of a pivotable connection. In that manner, steering wheel 22 is adjustable by pivoting the same to a desired angle. Pivotable connection may be achieved by way of a ball and socket or by such similar pivotable connection between head 49 and cradle 50.

Referring to FIG. 2, with a game controller positioned and secured within the steering wheel compartment—a player naturally controls the steering wheel—much the same way one would in a real-life car. The enclosed remote accordingly controls a car shown on a screen in accordance with any of various video driving games. The car is lightweight and can be easily moved around within signal range of the game's controller/sensor.

As may be well understood, the game controller requires line of sight to the console so that the mounting of the game controller must be such that even though it is housed within an inflatable kart, it must be positioned to provide such line of sight communication. To achieve that end, the steering wheel is positioned at the peak 25 of front body structure 24 (as shown in FIG. 1).

It will be understood that various types of vehicles and styles of sports vehicles could be produced according to different embodiments of the invention. For example, referring to FIG. 8, an inflatable personal watercraft (PWC) 61 is shown for simulating WII water sports. As shown, the vehicle is designed to mimic the look and feel of a real JET SKI or WAVE RUNNER. The PWC comprises an inflatable bottom platform 62, upon which an oblong seat 64 is disposed. An outward pointing front body 66 serves as a mounting point for a handle bar column 68. Handle bar 70 is pivotably connected to fixed column 68 by way of a pivot member or fulcrum as is well known in the art.

Figure 8:
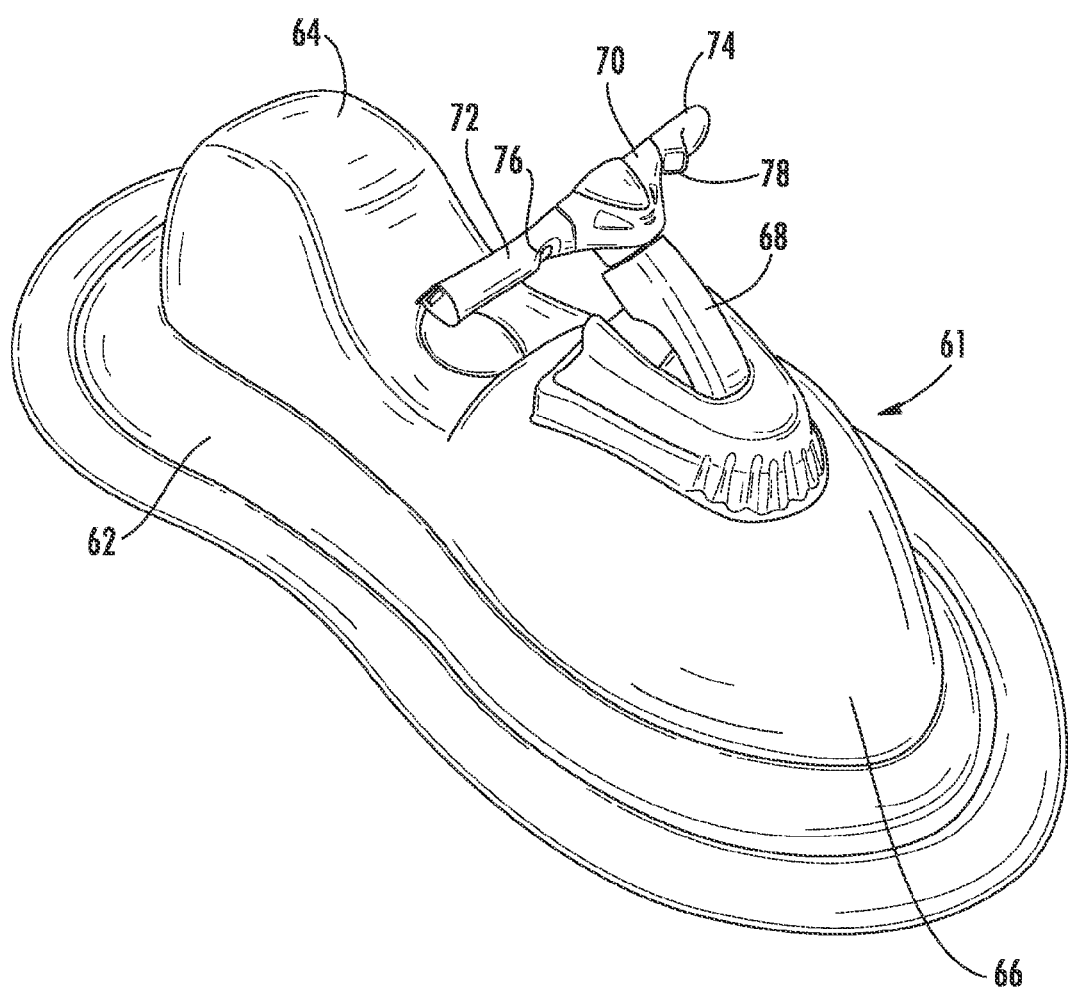
FIG. 8 is a perspective view of an inflatable water recreational vehicle according to an embodiment of the invention.

For some driving games, a WII nun chuck may be required for playing. To that end, in an embodiment of the invention, handle bar 70 is provided with two different compartments—each designed to receive respective units of the WII nun chuck. As shown in FIG. 8, handle bar 70 comprises a right-hand bar 72 and a left-hand bar 74. The right hand bar 72 comprises a compartment that is sized and shaped to receive a standard WII remote. As shown, a cut-out or window 76 is provided in the front-facing side of right-hand bar 72 to allow access to the "B" button of the WII remote. Left-hand bar 74 is sized and shaped to receive the complementary unit to the WII remote—forming the nun chuck. Left-hand bar 74 is similarly provided with a window 78 for allowing access to a button that is positioned on the underside of the nun chuck unit.

In other embodiments of the invention, a game controller holding assembly is attached to any of various inflatable vehicles or vessels, such as, an airplane, ship, submarine, army tank, and motorcycle in order to respectively simulate operating conditions of the same.

It will be understood by those of ordinary skill in the art that the invention set forth herein relates, broadly, to a novel inflatable vehicle having a game controller attachment means in a steering mechanism. The steering mechanism (e.g. steering wheel, handle bar, yoke, etc.) is either permanently or temporarily attached to a base on the inflatable vehicle. A base refers to any specific insertion or mounting point for a steering mechanism. For example, a base may comprise an area of reinforced material for receiving a steering wheel or an area having an attachment mechanism for attaching a steering mechanism.

It will be further understood that the invention is not limited to accommodating a WII remote—but encompasses an inflatable vehicle that similarly receives any game controller—wired or wireless. For example, a compartment 58 may be molded to accommodate SONY's MOVE controller or any similar game controller.

In one embodiment of the invention, the inventive inflatable vehicle is provided with different detachable steering wheels—each to accommodate respective differently sized game controllers. In another embodiment, a compartment inside a steering wheel is designed to receive different inserts—each insert being sized and shaped to respectively accommodate different game controllers.

Having described this invention with regard to specific embodiments, it is to be understood that the description is not meant as a limitation since further modifications and variations may be apparent or may suggest themselves to those skilled in the art. It is intended that the present application cover all such modifications and variation as fall within the scope of the appended claims.

What is claimed is:

1. An inflatable vehicle for sitting in while playing video games, said vehicle comprising:
    an inflatable body, said inflatable body comprising a seat and inflatable steering wheel attachment structure;
    said inflatable wheel attachment structure comprising a base for receiving a rotatable steering wheel;
    an attachment structure for attaching said steering wheel to said inflatable wheel attachment structure;
    said steering wheel comprising a compartment that is sized and shaped to receive a game controller,
    whereby when said steering wheel is rotated, said game controller controls a game displayed on a screen.

2. The inflatable vehicle of claim 1, whereby said steering wheel is detachable from said steering wheel attachment structure.

3. The inflatable vehicle of claim 2, whereby said steering wheel attachment mechanism comprises a steering column cap for connecting said steering wheel to said base, said steering column cap comprising a tubular member having a first end which attached to said base and a second end having a pivoting head.

\* \* \* \* \*